United States Patent [19]

Baldwin

[11] Patent Number: 5,198,897
[45] Date of Patent: Mar. 30, 1993

[54] CONTINUOUS-MOTION LINE-ASSEMBLY TELECINE WITH MISREGISTRATION CORRECTION

[75] Inventor: John L. E. Baldwin, Eastleigh, United Kingdom

[73] Assignee: Rank Cintel Limited, United Kingdom

[21] Appl. No.: 793,798

[22] Filed: Nov. 18, 1991

[30] Foreign Application Priority Data

Nov. 16, 1990 [GB] United Kingdom ............... 90242971

[51] Int. Cl.$^5$ ...................... H04N 3/36; H04N 5/253; H04N 9/093
[52] U.S. Cl. ......................................... 358/51; 358/54
[58] Field of Search ........................... 358/51, 54, 214

[56] References Cited

U.S. PATENT DOCUMENTS 4,278,995  7/1981  Fearnside et al. ................... 358/54
4,652,929  3/1987  Stemme et al. ...................... 358/54

OTHER PUBLICATIONS

IBA Technical Review, Com.T.(C) 1172, Digital Video Processing-Dice-Line Interpolation by K. H. Barratt and J. H. Taylor.
The Television Society Journal, vol. 14, No. 1, Jan.-/Feb. 1972, pp. 1-29, a Standards Converter Using Digital Techniques, J. L. E. Baldwin, A. D. Stalley, H. D. Kitchin.

Primary Examiner—Victor R. Kostak
Assistant Examiner—Mark R. Powell
Attorney, Agent, or Firm—Ostrolenk, Faber, Gerb & Soffen

[57] ABSTRACT

A continuous-motion line-array telecine has a solid-state sensor comprising linear array sensor elements (101, 201, 301). For multi-standard operation compensation is provided for vertical misregistration due to different linear array sensor positions as seen at the sensor plane. The compensation is provided by relative delays (160, 260, 360) corresponding to vertical scan shifts of integral numbers of lines, and vertical interpolation circuits (110, 210, 310) for interpolating between lines for compensating any misregistration equivalent to any residual non-integral vertical scan spacing.

7 Claims, 6 Drawing Sheets

CONTINUOUS-MOTION LINE-ASSEMBLY TELECINE WITH MISREGISTRATION CORRECTION

This invention relates to a continuous-motion line-array telecine.

FIG. 1 of the accompanying drawings diagrammatically shows the optical path of a continuous-motion line-array colour telecine. FIG. 1 does not represent a particular known telecine but illustrates various features to be found in such telecines. A linear light source 10, which may use a mirror for reinforcement, is used to illuminate uniformly an area of cinematographic film which includes the line to be scanned, with the aid of a condenser system 20. The film is moved continuously at a uniform rate which provides the vertical scan during each film frame. The film motion in the film plane 30 is downwards, as shown in FIG. 1. The arrow A in the film gate represents an upward pointing arrow in the scene.

An object lens 40 is arranged to focus the film plane 30 onto the image plane 50. For a monochrome telecine a single linear array sensor would be placed on the optical axis at the point 60 with its length perpendicular to the plane of the paper. The light falling on each of the consecutive equispaced elements of the array is proportional to the light transmitted through consecutive equispaced elementary areas in a line across the film.

The details of reading out information from the linear array sensor will not be described in detail, as they will be known to those skilled in the art, but the specific requirements are as follows. During a film frame, the read out of consecutive lines occurs at equal intervals of time, the time interval being chosen so that the vertical spacing of the scanning lines is correct. This requires consideration of the speed of motion of the film, the width of the scanned areas on the film, the required aspect ratio and the number of active lines in a frame. If film prints are intended for anamorphic projection the extent of the squeeze also needs to be considered.

The film motion causes each film frame to be scanned once in the vertical direction, giving a progressive or non-interlaced scan, so interlace is produced by writing the information sequentially into a frame store and reading alternate lines from the store on one field and the other lines from the store on the next field. Depending on the standards of the film in terms of film frames per second and the field frequency of the television system, the number of field read-outs from the store varies but it is important to maintain the interlace of the signal read out.

It is usual for the ratio of (a) the desired height of the picture to be scanned in the active television lines, to (b) the spacing between like points of successive film frames, to differ from the ratio of the active field duration to the total field duration. This may be overcome most elegantly by starting the line scan operation at the beginning of each frame at the same point with respect to each successive film frame. However other solutions are possible but often they provide only an approximation to the requirements.

The constant velocity of the film provides the motion which results in the vertical scan. However, it may be easier to think of this providing a motion of the image in the image plane 50. The horizontal scanning of this image occurs in the linear array.

To provide a colour telecine the light from the film has to be led to three linear array sensors for the red, green and blue components, respectively. This could be achieved by using a splitter block containing dichroic optical filters to provide wavelength-dependent splitting. However, the need for a splitting block may be avoided by placing the three linear array sensors, one above another, as shown at 101, 201 and 301 respectively in FIG. 1. Each of the three linear array sensors has an optical filter 102, 202, 302 with an appropriate pass-band to make the individual sensors respond essentially only to red, green and blue light, for sensors 101, 201 and 301 respectively. The order of the sensors is essentially arbitrary. It should be noted that the figure is not to scale.

FIG. 1 also shows an optical partially-reflecting surface 56, which may be used to provide a second image plane 51 for further linear array sensors, the proportion of light reflected to that transmitted being either constant or wavelength dependent. In FIG. 1 this surface provides an optical path to a fourth linear array sensor 401, which may be a luminance sensor. This sensor is so positioned that it is observing the same line on the film as sensor 201. The number of linear array sensors using the reflecting path need not be limited to one. Indeed there is no absolute limit to the number of sensors using either the direct or reflecting path.

It will be noted that a single line on the film will first be imaged on the sensor 301. Then, after the film has travelled a short distance, this line on the film will be imaged on sensor 201. Again, after a further short distance, the same line on the film will be imaged on the sensor 101.

At any one instant, the three sensors 101, 201, 301 are responding to light passing through the film along three different lines across the film. It is necessary that the light source 10 should illuminate all the lines to which, at any time, the sensors are responding. The condenser system is designed with this in mind.

Without correction, the separation of the lines on the film that the sensors are responding to would cause severe vertical misregistration of the colours. This misregistration may be decreased by reducing the separation between the sensors, but it can not be completely removed and the remaining error will still need to be compensated. Compensation is achieved by delaying two of the signals by an amount equal in each case to the time by which it would otherwise be advanced with respect to the third signal. These time delays will depend on the velocity of the film, and it is also necessary to arrange that the timing of the start of the line scans of each advanced sensor is such that, when the signal has been delayed to remove the vertical misregistration, the timing of the start of the line of the delayed signal must be the same as that of the signal from the sensor which needs no delay.

The arrangements for this are illustrated diagrammatically in FIG. 1. The output of sensor 101 is applied directly to an output 170 for the R signal. The output of sensor 201 is applied to an output 270 for the G signal through a delay 260 providing a delay of time t. The output of sensor 301 is applied to an output 370 for the B signal through a delay 360 providing a delay of time 2t. Corresponding adjustments will generally have to be made to the control signals used to cause the sensors to start to produce a new line. Line scan control circuit 90 produces the necessary scan-control signals. As illustrated, read-out clock signals commanding the sensors to start to output a new line are applied directly to sensor 301, through a delay 203 providing a delay of time t to sensor 201, and through a delay 103 providing a delay of time 2t to sensor 101. The delays 103 and 203 are illustrative only and their function could be subsumed into the control circuit 90.

An example of a known telecine scanning system essentially of the above type is to be found in U.S. Pat. No. 4,278,995.

The need to have different timing for the start of the line scans for the three sensors is disadvantageous, but the separation of the sensors may be varied to alter the required delay. This is used to make the required delays equal to multiples of the line scanning period, so that the same timing can be used for the start of the line scanning for all three sensors. For systems where there is a disturbance to the line scan during the vertical blanking period there is a potential fundamental problem, to this solution; this would arise if the time difference, between the longest and shortest signal delays, was greater than the time between the end of scanning the active part of one frame of the film and the beginning of scanning the active part of the next frame.

The same line scan timing for all the sensors has certain benefits. It may make it possible to incorporate all three sensors in one device, leading to significant further benefits. For example, the sensors are likely to have more similar characteristics, reducing the probability of undesired colour shading across the width of the picture. Other advantages accrue, for example the sensors can be brought closer to each other so decreasing the amount of compensating delay.

However, there is the disadvantage that the spacing between the sensors must correspond to an integral number of picture lines on the image plane. This causes problems when the telecine is to be designed to produce television signals to different television standards. The picture line separation depends on the number of active lines of the television standard and on the effective height of the image of the film frame to be scanned. If the picture width be assumed constant and the spacing between sensors be 8 lines on a 1250 line 16:9 aspect ratio picture, this spacing would correspond to 6 lines for a 4:3 aspect ratio picture. The same spacing would correspond to 4 lines on a 625 line 16:9 standard and 3 lines if the aspect ratio be 4:3.

However, the same spacing would not correspond to an integral number of lines on a 1050 line or on a 525 line standard with either 16:9 or 4:3 aspect ratios. A different spacing would be required and yet another would be required for 1125 line 16:9 aspect ratio. Similar problems arise when different film formats are to be scanned.

A solution to the above problem based on the use of optical components is described in United Kingdom Patent Application GB-A-2,243,259 published Oct. 23, 1991, but the use of additional optical components can be disadvantageous.

Sometimes it is convenient to arrange a plurality of sensors with a lower number of elements to behave like an array of greater length. These sensors may look at different lines or parts of lines on the film image and the resulting signals combined by means including delays. The sensors may look at different parts of a line but a number of alternative approaches are possible. These include one in which the sensors respond to every nth columns in a picture. In this case, if there were 3 sensors, one would respond to elements in columns 1, 4, 7 . . . , the second to elements in columns 2, 5, 8 . . . and the third to elements in columns 3, 6, 9 etc.

In another arrangement, four line array sensors may be used to generate one scanning line, i.e. a monochrome signal. This may be done so as to provide a high resolution along the scan line; if a single array is used for this purpose the clock speeds required to empty the array may be impossibly high. The four arrays are arranged in a so-called castellated form, with the first and third arrays at one vertical position and the second and fourth arrays at a slightly different vertical position. This form can be used to avoid any discontinuity at the transition points. Appropriate electronic delays are of course required as well as means to change the clock frequency. However, it will be apparent that there is again a situation where arrays which are supposed to relate to a single scanning line are spaced apart in the direction of film motion. The same problem as just discussed for a colour device will thus apply for an individual component if multiple standards or formats are attempted.

An important case would be the use of this castellated approach providing improved definition for the luminance component in combination with the more normal approach for the colour components where definition is, by comparison, less important.

FIG. 1 does not show the non-linear operation of gamma correction. FIG. 2 shows how the signal from the linear array sensor 101 is applied via a gamma corrector 140 to a delay line 160 of delay time equal to "p" lines. The sequence of gamma correction before delay is preferred; if the delay were prior to gamma corrector the delay would require a greater dynamic range. For a digital realisation 11 or 12 bits per word would be required for the delay if it preceded gamma correction, but only 8 or 9 would be needed for the preferred position. The signals from the other linear array sensors 201, 301 are routed via gamma correctors 240, 340 to delays 260, 360 respectively. The delay lines 160, 260, 360 have delays of p, p+q and p+2q lines respectively.

SUMMARY OF THE INVENTION

According to the present invention, there is provided a continuous-motion line-array telecine, comprising a light source, means for continuously driving a cinematographic film through a film gate, means for illuminating at least a part of an aperture in the film gate with light from the light source, line array light sensor means, and a lens system for imaging the illuminated film in the film gate on the line array sensor means, the line array sensor means having multiple line array sensors arranged with their length transverse to the direction of movement of the image of the film for successively providing outputs representing colour components and/or luminance components of a line across the film, characterized by means for compensating vertical misregistration between the outputs of the line array sensors, the compensation means comprising delay means for providing relative delays corresponding to vertical scan shifts of integral numbers of lines, and vertical interpolation means for interpolating between a plurality of vertically adjacent line scans for compensating for misregistration equivalent to any residual non-integral vertical scan spacing.

Interpolation between lines is known for example in the context of standards conversion see for instance a paper "Line Interpolation" by Barratt, K. H., and Taylor, J. H. published in IBA Technical Review No. 8, pages 49–62, published by Independent Broadcasting Authority, London, and in a paper by Baldwin, J. L. E., Stalley A. D., and Kitchin, H. D., entitled "A Standards Converter using Digital Techniques" in The Royal Television Society Journal, January/February 1972 pages 3–11.

It is more correct and hence preferred to interpolate signals which have not been gamma corrected. For digital gamma correction, the effects of aliasing that can arise from the non-linear transfer characteristic may be reduced by using pre-gamma de-emphasis. The reduction of the response at middle and high frequencies would be fully restored, under small signal conditions, after the gamma correction. The pre-gamma de-emphasis can be incorporated in the interpolation without any increase of interpolation complexity, and indeed it is found that better interpolation actually results from the incorporation.

BRIEF DESCRIPTION OF THE DRAWINGS

The invention will now be described in more detail, by way of example, with reference to the drawings, in which:

FIG. 3 shows in diagrammatic form, the processing for a preferred colour linear-array telecine according to the invention. Three identical channels are shown, the numbers for corresponding blocks differing by multiples of one hundred. Usually, one channel can dispense with the interpolator since that channel can be defined as the reference to which the others have to be registered. It is usually best if the channel without an interpolator be the one giving maximum contribution to the luminance channel, so it would be the green channel in the case of a red, green, blue telecine. However, if a separate luminance linear array were used, requiring a fourth channel, it will usually be best to use this as the reference to which other signals have to be registered.

FIG. 3 shows the three line array sensors 101, 201 and 301. Considering sensor 101, an interpolator 110 is connected to the sensor output, and supplies a signal which is applied through a pre-gamma de-emphasis filter 130, a gamma corrector 140, and a post-gamma equaliser 150, to a delay 160 providing a delay of p lines. The delay output at 170 is applied to a frame store, which may be used to convert the progressively scanned (non-interlaced) signal into a signal in interlaced form. The circuitry associated with the sensors 201 and 301 is similar subject to alteration of the delay period as in FIG. 2.

It should be noted that the term "de-emphasis" is used here, rather than the term "pre-emphasis", as the function provided is one in which the gain generally decreases with increasing frequency. The compensating function is provided by the "equaliser".

It is theoretically better for the interpolator 110 to operate on signals which have not been gamma corrected but in principle an interpolator could be used at all positions in the signal chain. The pre-gamma de-emphasis filter 130 and post-gamma equaliser 150 are desirable but are not mandatory. The post-gamma equaliser may be anywhere in the signal chain after the gamma corrector. The delays 160, 260, 360 providing integral number of lines delay may be anywhere after the linear array sensors, although usually it will be most convenient if each is realised, not by specific hardware, but by appropriately altering of the addressing of the frame store used for progressive-to-interlace conversion, preferably on the write addressing, though it could be on the read addressing.

Figure 4:
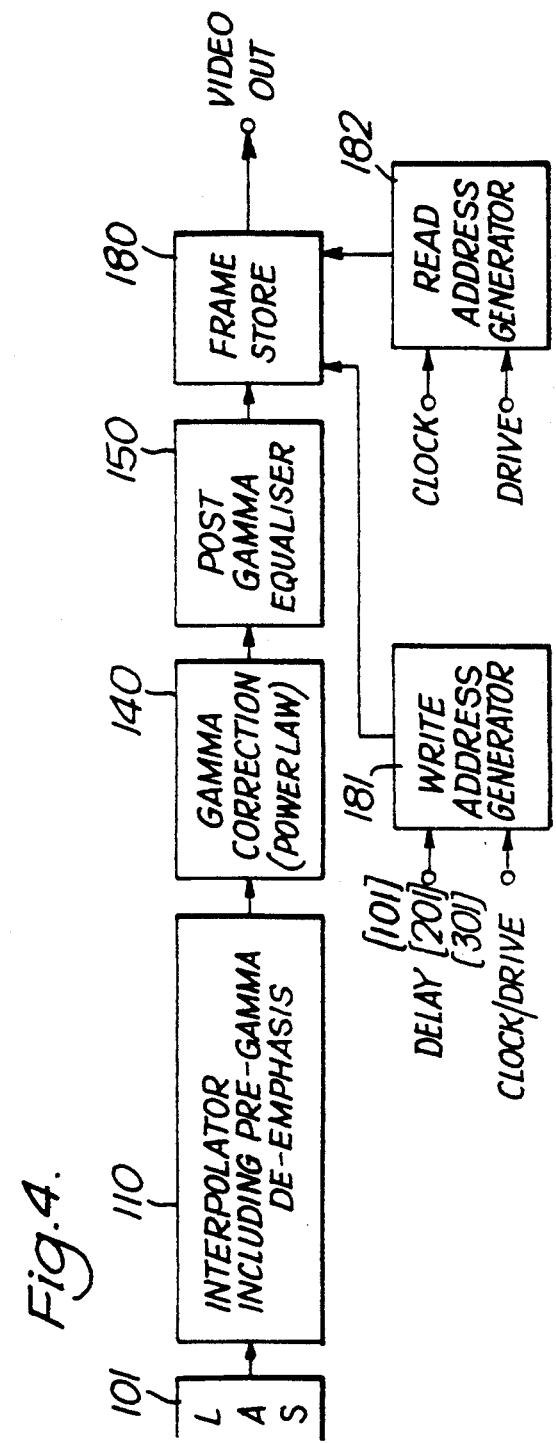
FIG. 4 illustrates one channel of a preferred embodiment for such a telecine.

FIG. 4 shows a preferred embodiment of one of three similar channels required for a colour telecine, in which the function of pre-gamma de-emphasis is included in the characteristics of the interpolator 110. The frequency response of the interpolator is required to be that of a slow roll-off low pass filter instead of a sharp cut-off filter; for example the gain at half the Nyquist limit may be 6dB down compared to the low frequency gain. This change of response only needs a change of the interpolation coefficients. The computation of these coefficients is described later.

Figure 1:
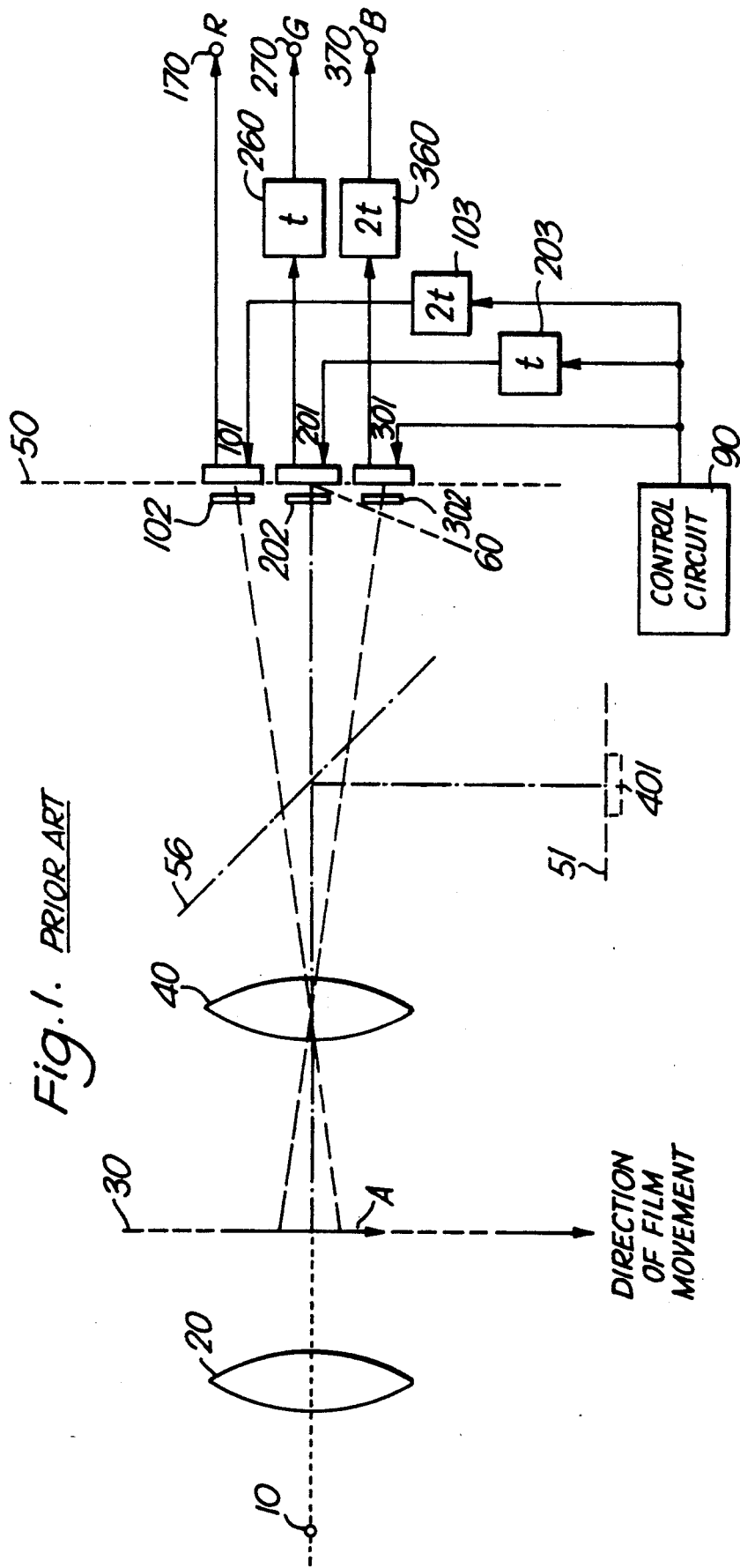
FIG. 1 (referred to above) illustrates a known continuous-motion line-array colour telecine.
Figure 2:
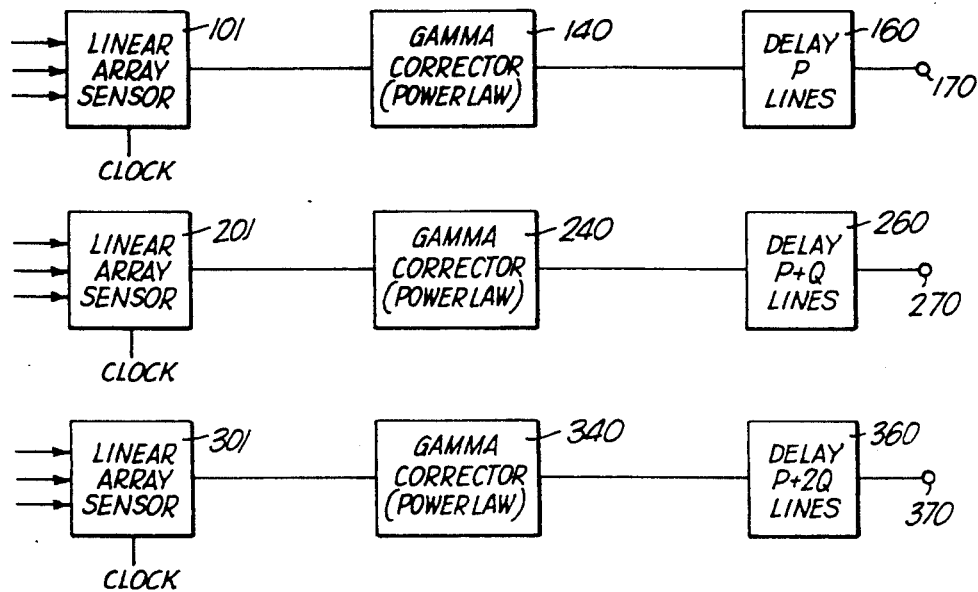
FIG. 2 (referred to above) illustrates known signal processing for such a telecine.
Figure 3:
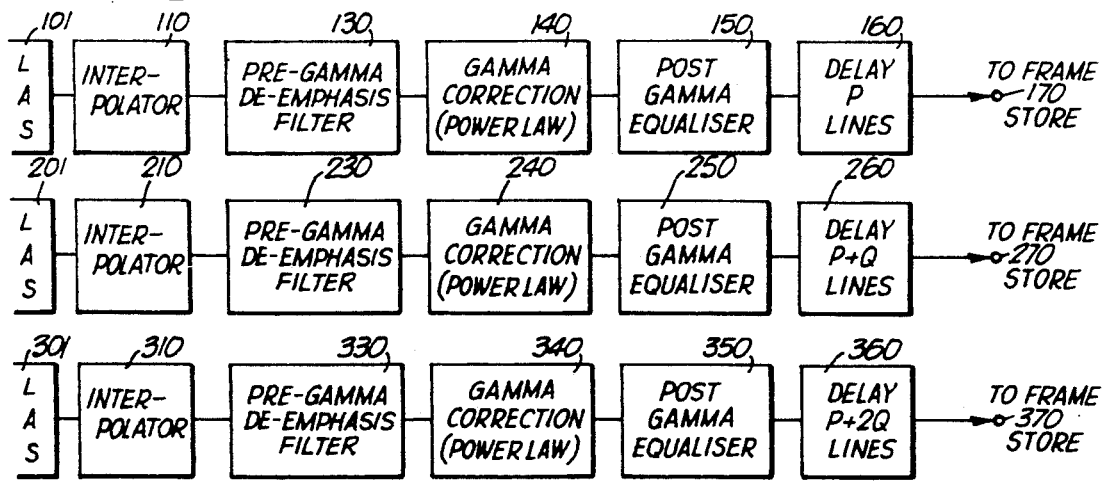
FIG. 3 illustrates the principles of the signal processing for a continuous-motion linear array colour telecine embodying the invention.

FIG. 4 also indicates how the delay of integral lines, namely the delays 160, 260 and 360 of FIG. 3, can usually be replaced by appropriate operation of the frame store 180 needed to convert the progressive output of the linear arrays into an interlaced signal. For this purpose the write address generator 181 associated with the frame store 180 receives a delay instruction appropriate to the sensor 101, 201 or 301 as well as the usual clock/-drive signals. The read address generator 182 functions normally. The operation of this conversion will be understood by those skilled in the art and will not be described. The physical separation of the linear array sensors results in the three arrays observing different horizontal lines on the film image so causing misregistration.

It is necessary to calculate the relationship between the physical separation and the misregistration in scanning lines. The height of the film image is equal to the width of the film image divided by the Aspect Ratio. In this calculation a 4:3 Aspect Ratio (AR) is expressed as 1.333, whilst a 16:9 AR would be 1.777. The spacing of the scanning lines is the image height divided by the number of active lines in the television standard. Knowing the spacing of the scanning lines and the physical separation between the linear array sensors the misregistration in scanning lines can be calculated. The above assumes that the film is not intended for anamorphic projection.

It should be realised that the horizontal scanning frequency of the linear array sensors has to result in the appropriate number of active lines in the desired film image height and this is a function of a number of parameters including the Aspect Ratio to be scanned, the number of active lines in the standard and the speed of motion of the film.

It is always possible to arrange that the physical separation of the array sensors corresponds to an integral number of scanning lines for one chosen set of operating conditions. Sometimes it is possible to arrange this integral relationship for two wanted sets of operating conditions, and sometimes more, but as the number of sets of operating conditions increase this integral relationship cannot be maintained.

If the separation be 8 lines for a 1250 line 16:9 standard, it would be 6 lines for a 4:3 aspect ratio; for the 625 line standard, it would be 4 lines for 16:9 and 3 lines for a 4:3 aspect ratio. However, if the same physical separation be used, for 1050 line the figures would be 6.72 and 5.04, whilst it would become 3.36 and 2.52 on the 525 line standard. Again, the same physical separation on a 1125 line 16:9 standard would result in 7.20 lines misregistration.

Even if the basic operation were on the 1250 line 16:9 standard, a change of desired vertical scanned height by 1% would cause a misregistration of 0.08 line, which is near the limit of acceptability.

It is convenient to arrange that the interpolator 110 has a range of adjustment of ±0.5 line and, if the green interpolator is assumed to give zero shift, the interpolators in the other channels can be used so that a balance of an integral number of lines remains to be corrected by the write address generator 181. If the figures given above are used, then for 1050 line 16:9, the red channel would need to be advanced by 6.72 line; this would be achieved by interpolation causing a delaying shift of 0.28 line pitch and an alteration of the write address to cause an advance of 7 lines. For the blue channel the interpolation would produce an advancing shift of 0.28 line pitch and the alteration of the write address to cause a delay of 7 lines.

It is probably easier to consider that the write address sequence for the blue frame store will be used 7 lines later for the green frame store; a further 7 lines later the same write address sequence will be used for the red frame store. This assumes that the blue, green and red frame stores are to be read simultaneously, using one read address generator.

Figure 5:
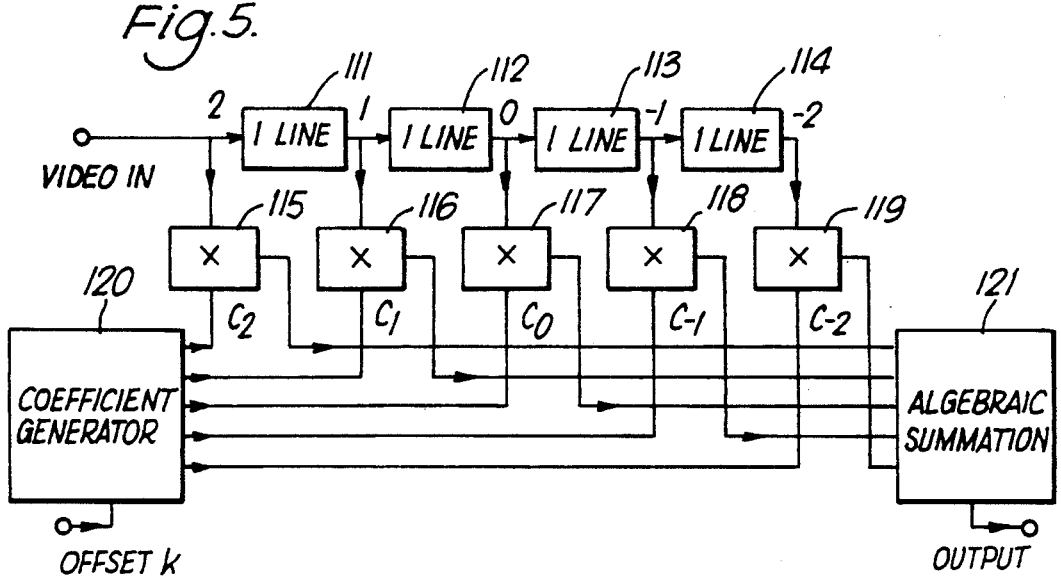
FIG. 5 illustrates in greater detail the vertical interpolation used in one channel of such a telecine.

In FIG. 5 the outputs from four series-connected line delays 114, 113, 112, 111 and the input to line delay 111 will always represent signals from points successively lower on a short vertical line. The highest point on this line will correspond to the signal at the output of the last line delay 114 and the lowest point will correspond to the input of the first line delay 111. It is assumed that the line numbers increase with successive picture lines and are numbered with respect to the central line. The signals appearing at points $-2, -1, 0, 1, 2$ are multiplied in multipliers 115 to 119 by their appropriate weighting coefficients $C_{-2}$, $C_{-1}$, $C_0 C_2$ and the products are algebraically summed in a summation circuit 121. The coefficients are produced, under the control of the offset k, by the coefficient generator 120.

When offset k has a value of +0.5, which is the maximum, the output would be appropriate for a line position half a line pitch below the central line. As the value of k decreases, the output would be appropriate for higher line positions until it reaches a position half a line above the central line when $k=-0.5$.

Figure 7:
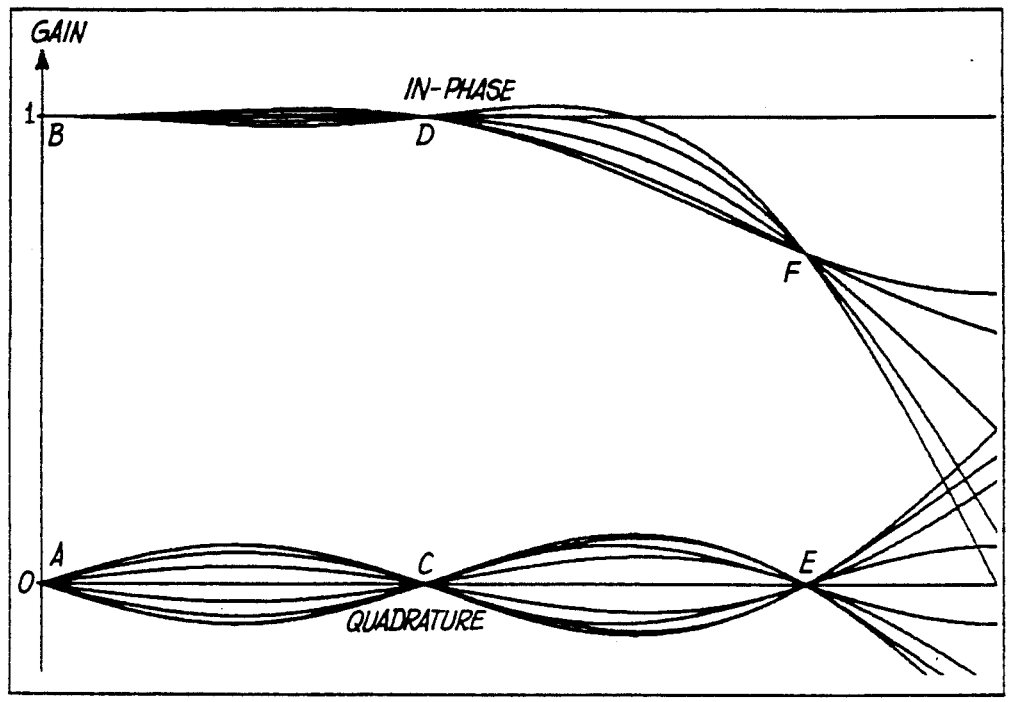
FIG. 7 shows a vertical frequency response of an interpolator, indicating in-phase and quadrature errors.
Figure 9:
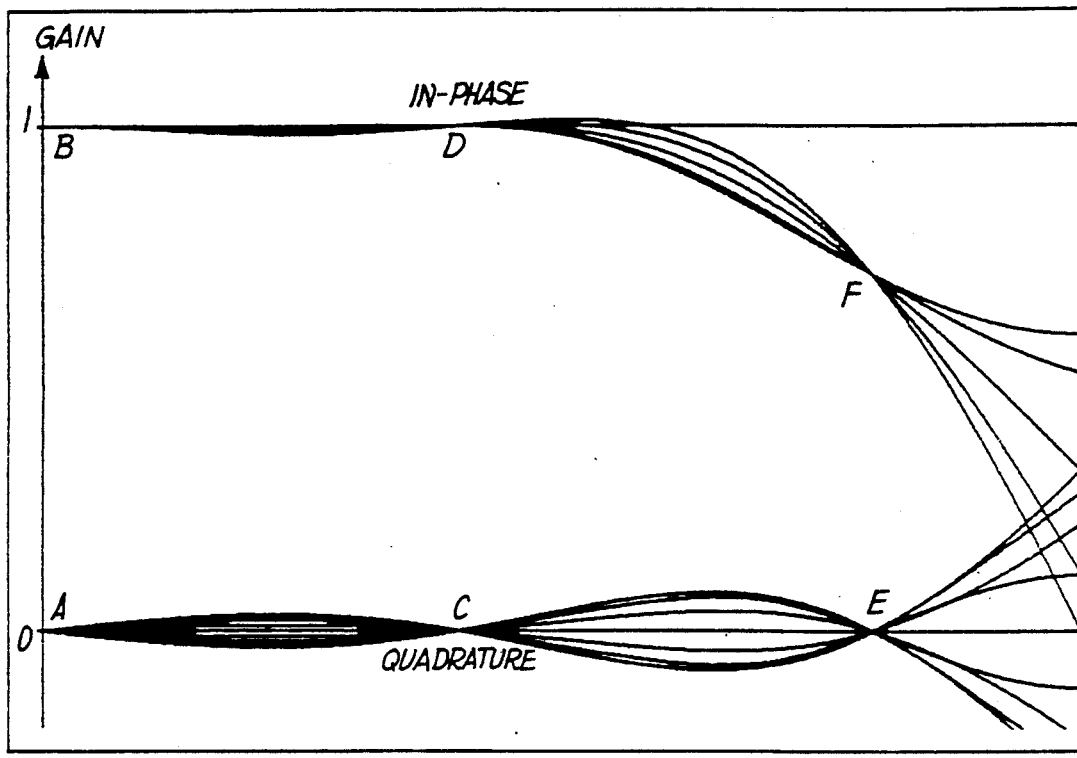
FIG. 9 shows an improved overall frequency response resulting from the inclusion of the pre-gamma de-emphasis into the interpolator.
Figure 10:
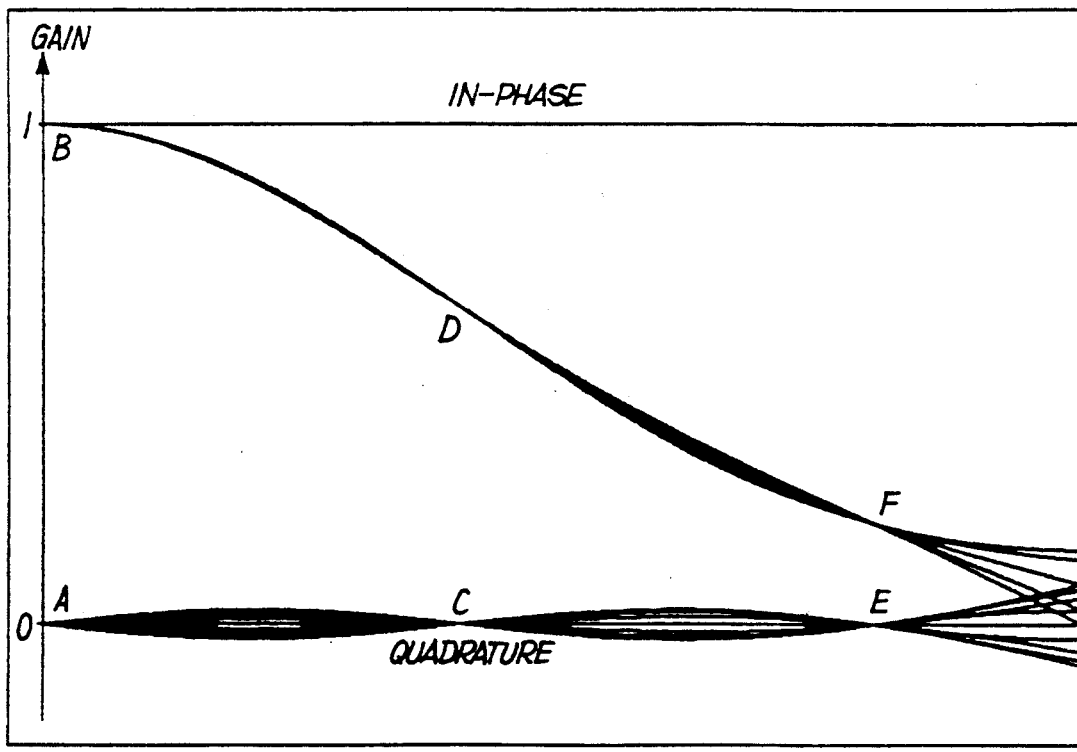
FIG. 10 shows the frequency response of the interpolator including provision for the de-emphasis.

One of the better methods of selecting appropriate coefficients is to choose them such that the in-phase component of the response has a particular value at chosen defined frequencies and that the quadrature component error is zero at defined frequencies, which may be differently chosen. If five coefficients are available, five defined points may be chosen. FIGS. 7, 9 and 10 are based on the defined points for the in-phase response being at frequencies of 0, 0.4 and 0.8 of the Nyquist frequency and the defined points for the quadrature component error being zero are at frequencies of 0.4 and 0.8 of the Nyquist frequency. These particular frequencies have been chosen more to show differences between approaches rather than to give the optimum performance for each approach.

Frequencies can be defined in various ways; cycles per second, radians per second and cycles per picture height are all well known. Since for this purpose it is convenient to work in normalised frequency, one approach would be to express it in terms of the Nyquist frequency, but the approach which will be used is to express the normalised frequency in terms of degrees per sample. The Nyquist limit will then be at 180° per sample and the frequencies of 0, 0.4 and 0.8 of the Nyquist limit will correspond to 0°, 72° and 144° per sample.

Figure 6:
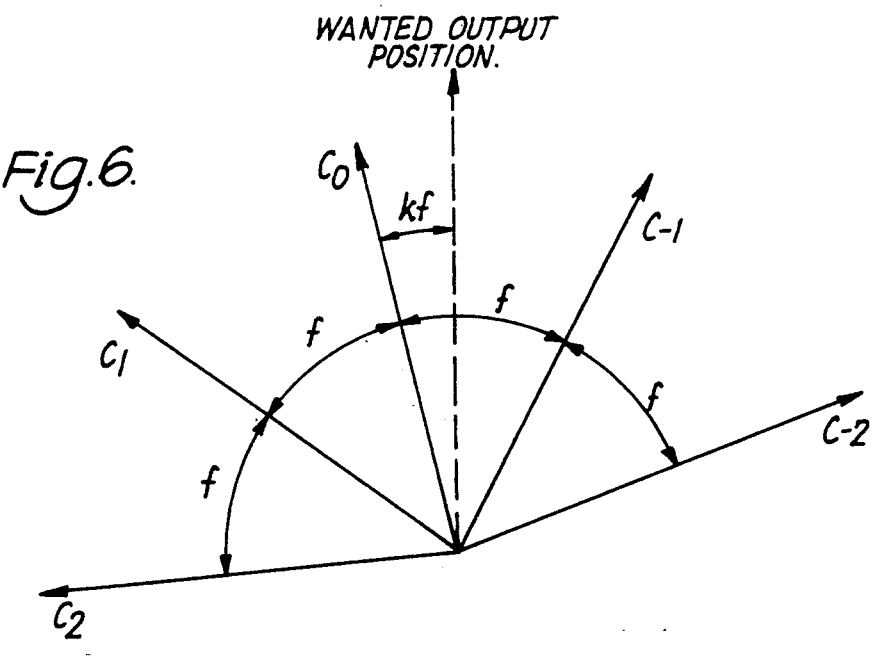
FIG. 6 shows a vector diagram illustrating the principles by which interpolation coefficients are calculated.

The principle of the computation is shown in FIG. 6. It is assumed that the input signal will be of cosine wave shape of frequency f° per sample with a peak value of 1 and also that this peak would occur at the wanted output position. The in-phase components, at points marked $-2, -1, 0, 1, 2$ will be $\cos(kf-2f)$, $\cos(kf-f)$, $\cos(kf)$, $\cos(kf+f)$ and $\cos(kf+2f)$, respectively. The quadrature components at the same points will be: $\sin(kf-2f)$, $\sin(kf-f)$, $\sin(kf)$, $\sin(kf+f)$ and $\sin(kf+2f)$.

The in-phase $E_{in}$ and quadrature $E_{qu}$ outputs of interpolation will be:

$$E_{in}=C_{-2}*\cos(kf-2f)+C_{-1}*\cos(kf-f)+C_o*\cos(kf)+C_1*\cos(kf+f)+C_2*\cos(kf+2f)$$

$$E_{qu}=C_{-2}*\sin(kf-2f)+C_{-1}*\sin(kf-f)+C_o*\sin(kf)+C_1*\sin(kf+f)+C_2*\sin(kf+2f)$$

where * indicates the operation of multiplication. It will be noted that since $\sin(0)=0$, the quadrature error component $E_{qu}$ will also be zero at zero frequency.

If $E_{in}$ be defined as 1 at 0° and 72° per sample, and as 0.707 at 144° and $E_{qu}$ be defined as 0 at 72° and 144° per sample, there will be 5 equations, appropriate to evaluate the 5 coefficients.

FIG. 7 shows the frequency response of the in-phase and quadrature gains. The points B, C, D, E and F are the points where the response was defined. Point A is the additional zero of the quadrature errors at zero frequency. The horizontal direction is frequency, from zero at the left to 180° per sample, at the extreme right of the curves. Horizontal lines at 0 and 1 provide gain references. The individual curves are for different values of k from $k=-0.5$ to 0.5 in steps of 0.125; this would give 9 curves but since the value of the cosine of an angle is independent of the sign of the angle, mirror image cases superimpose. When $k=0$ the quadrature error is zero at all frequencies and the curve is superimposed on the horizontal axis.

At any specified frequency, there is little reason to suppose that a given departure of the quadrature error from zero is subjectively more or less objectionable than an equal departure of the in-phase response from 1. However, the subjective effect of an error at high frequencies is much less than the same error at low frequencies. In FIG. 7 the most significant errors are for the quadrature component in the region between A and C.

The combining of the pre-gamma de-emphasis with the interpolation could be achieved by suitable choice of gains at constraint points D and E. An alternative and preferred approach is to select the post-gamma equaliser and to retain the original gains at the constraint points but to use these gains for the cascaded connection of interpolator and equaliser.

The preferred equaliser is a five-tap symmetrical filter with successive coefficients in the proportions 1, −6, 18 −6, 1. These add up to a power of two, when regard is had to the sign of the coefficients.

Figure 8:
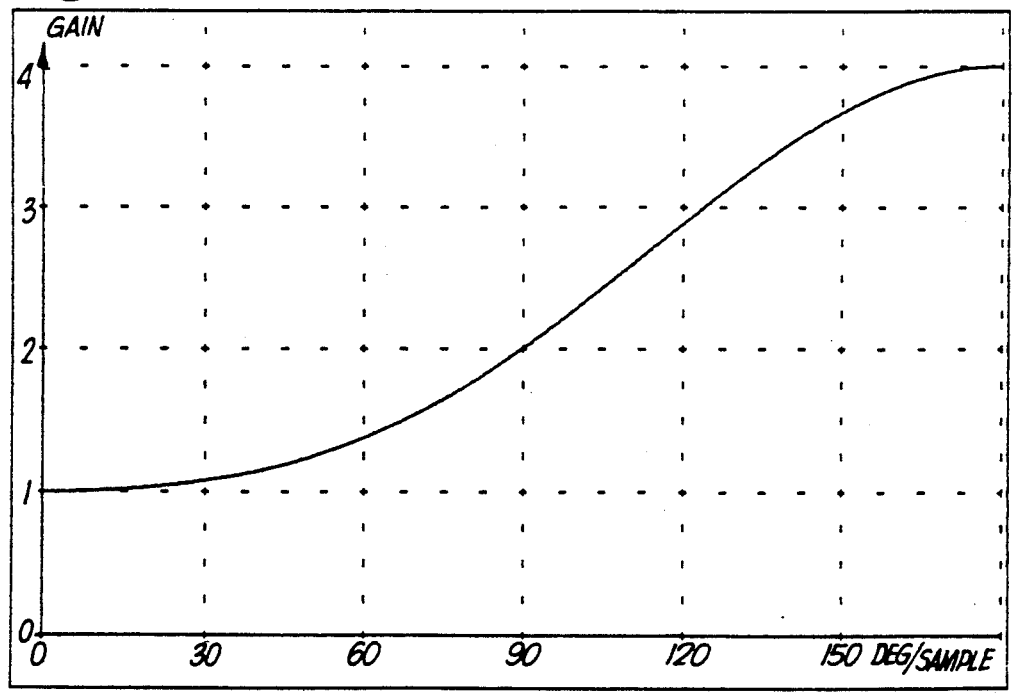
FIG. 8 shows the frequency response of a suitable post-gamma equaliser.

FIG. 8 shows the equaliser frequency response; the gain rises with increasing frequency becoming 2 at 90° per sample and reaching 4 at 180° per sample, compared to the low frequency gain.

FIG. 9 is of the same form as FIG. 7 but shows the overall characteristics of an interpolator, which now includes the pre-gamma de-emphasis, together with the post-gamma equaliser. The constraint points B, C, D, E and F are identical to those used for FIG. 7 but now they constrain the response of the interpolator, with pre-gamma de-emphasis characteristics, together with the separate post-gamma equaliser. By comparison with FIG. 7 it can be seen that the variation of both the in-phase and quadrature responses has been significantly improved, particularly in the region between A and C.

FIG. 10 is of the same form as FIG. 9, and is for the interpolator, with pre-gamma de-emphasis characteristics incorporated, but without the post-gamma equaliser. The gain falling with increasing frequency shows the pre-gamma de-emphasis provided. The points D and F have been moved near to the curve but the actual gains at these frequencies have not been defined as such, except by implication of the frequency response of the equaliser.

A further modification will now be considered. If the luminance channel operates using the castellated method described above on a higher definition standard, such as 1250 lines, but the linear array sensors for the colour channels operate at a lower resolution standard, with half the number of lines, then a standards 2:1 up-conversion would be required for the colouring information. One way of incorporating this would be to use the interpolators similar to 110, 210 and 310 to provide the interpolation for this up-conversion. Two output lines would be required for each input line with the value of offset k, in FIG. 5, differing by 0.5 between the two output lines. Ignoring the requirements of gamma correction and possible post-gamma equalisation there seems to be three alternative realisations.

One way of realisation would be to produce the two lines essentially at the same time, with the multiplication and the algebraic summation operating at twice the word rate with the value of the coefficients alternating, for alternate words, between values appropriate for the two values of k. With this approach the output words would need to be steered, word alternately, to the appropriate lines of the frame store. For this approach the operation of the 1 line delays 111, 112, 113, 114 in each interpolator would be unchanged to that normal for the lower resolution standard.

A second way would be to use a short buffer store prior to the interpolation in which a line of information written in during one line was read out as two identical lines, each lasting half the time. In this case the block diagram of the interpolation shown in FIG. 5 would be unchanged although it would operate at twice the clock rate. The interpolation coefficients would have to alternate between first and second presentations of the input lines. Steering of the output words to appropriate lines of the frame store would still be needed, however this steering would be an output line at a time. This approach would be particularly useful for multipliers in which one input port is much slower than the other.

There is the third possibility of two separate interpolators one providing odd lines to the frame store, the other providing the even lines.

The first two approaches can be used with a single gamma corrector and post-gamma equaliser between the interpolator and the frame store, for each colour channel; for the third approach, duplicate gamma correctors and post-gamma equalisers would be required for each channel.

I claim:

1. A continuous-motion line-array telecine, comprising a light source, means for continuously driving a cinematographic film through a film gate, means for illuminating at least a part of an aperture in the film gate with light from the light source, line array light sensor means, and a lens system for imaging the illuminated film in the film gate on the line array sensor means, the line array sensor means having multiple line array sensors arranged with their length transverse to the direction of movement of the image of the film for successively providing outputs representing colour components and/or luminance components of a line across the film, characterized by means for compensating vertical misregistration between the outputs of the line array sensors, the compensation means comprising delay means for providing relative delays corresponding to vertical scan shifts of integral numbers of lines, and vertical interpolation means for interpolating between signals representing a plurality of vertically adjacent line scans for compensating for misregistration equivalent to any residual non-integral vertical scan spacing.

2. A telecine according to claim 1, in which the delay means provides relative delays which are an integral multiple of the read-out scanning period of the sensors.

3. A telecine according to claim 1, including means coupled to the interpolator output for providing gamma correction of the signal.

4. A telecine according to claim 3, including de-emphasis means coupled prior to the gamma correction means and complementary equalisation means coupled subsequent to the gamma correction means.

5. A telecine according to claim 4, in which the de-emphasis means is constituted by the interpolation means.

6. A telecine according to claim 1, in which the interpolation means comprises a plurality of delay elements, means for multiplying the resultant plurality of signals by appropriate coefficients, and means for summing the resultant signals.

7. A telecine according to claim 1, in which a luminance output signal is generated using a higher line standard than is used for the colour output signals, and including means for up-converting the line standard of the colour signals.

* * * * *